(12) United States Patent
Eke

(10) Patent No.: US 8,280,937 B2
(45) Date of Patent: Oct. 2, 2012

(54) SPARSE-CODED LOOK-UP TABLE

(75) Inventor: David Richard Eke, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 1197 days.

(21) Appl. No.: 12/108,168

(22) Filed: Apr. 23, 2008

(65) Prior Publication Data

US 2008/0270441 A1  Oct. 30, 2008

(30) Foreign Application Priority Data

Apr. 26, 2007 (GB) .................................. 0708122.7

(51) Int. Cl.
*G06F 7/38* (2006.01)
*H03G 3/00* (2006.01)

(52) U.S. Cl. ........................................ 708/235; 381/104
(58) Field of Classification Search .................. 708/204, 708/209, 235; 381/104–109
See application file for complete search history.

(56) References Cited

U.S. PATENT DOCUMENTS

| | | | |
|---|---|---|---|
| 5,155,823 A * | 10/1992 | Tsue | 711/217 |
| 5,303,069 A * | 4/1994 | Speciner | 358/3.1 |
| 6,338,154 B2 * | 1/2002 | Kim | 714/743 |
| 6,549,519 B1 | 4/2003 | Michels et al. | |
| 6,738,304 B2 * | 5/2004 | Benedix et al. | 365/222 |
| 7,558,961 B2 * | 7/2009 | Sharma et al. | 713/176 |
| 7,827,218 B1 * | 11/2010 | Mittal | 707/899 |
| 7,929,712 B2 * | 4/2011 | Katayama | 381/104 |
| 2003/0014711 A1 | 1/2003 | Yuan | |
| 2003/0131221 A1 | 7/2003 | Lloyd | |
| 2006/0041609 A1 | 2/2006 | Pellar | |

* cited by examiner

Primary Examiner — Chat Do
Assistant Examiner — Matthew Sandifer
(74) Attorney, Agent, or Firm — Dickstein Shapiro LLP

(57) ABSTRACT

A look-up table (LUT) is arranged as a plurality of rows each indexed by an index value and storing at least a coefficient for each index value for use in processing digital data. The LUT contains repeated sections in which m coefficients stored for successive index values form a cycle. The number m is not an integer power of 2. For example the LUT may be used when converting a digital count to a gain in dB, in which case m may be 6 or 12, the coefficients representing dB or fractional-dB steps in gain. The LUT contains n additional blank rows inserted after every repeated section of m rows storing the cycle of m coefficients, n being 1 or more and (m+n) being an integer power of two (such as 8 or 16). By feeding an initial index value through encoding logic which takes account of the additional rows, it can be ensured that these are never indexed. Thus, a sparse-coded LUT is provided. Although each repeated section is increased in size, the actual size of the LUT in terms of circuit area or programming logic is reduced because the repeating length is now a power of two.

19 Claims, 3 Drawing Sheets

SPARSE-CODED LOOK-UP TABLE

BACKGROUND OF THE INVENTION

1. Field of the Invention

The present invention relates to look-up tables and more particularly to a technique for structuring a look-up table in such a way as to reduce complexity.

2. Description of the Related Art

A look-up table (henceforth called a LUT) is commonly used in digital signal processing to translate an input value into a different output value by using the input value as an index to a pre-stored entry in the table, thereby saving or reducing the need for computation of the output value. The pre-stored entry either provides the required result directly or enables this to be found more easily.

Many systems use coefficients that change in a repeated series of values, or a series of instructions that repeat. For example, audio systems make use of such repeating series in volume ramps i.e. volume settings. In such audio systems, it is necessary to provide a look-up table (LUT) to match the current count (provided by an incremental binary counter) with the corresponding coefficient value, or instruction.

FIG. 1 shows a known counter 10 and LUT 12 as described above, where the repeating sequence is of non-binary length. In this specification, the expression "binary length" refers to a length which is an integer power of two, i.e. 2, 4, 8, and so on. Thus, a "non-binary length" is any other integer value.

An example of where the arrangement of FIG. 1 may be used is in audio applications, in which a volume ramp is applied to an audio sample to change its gain (volume) under control of a count value. Typically, a volume ramp uses a series of six values (each representing a −1dB step in the gain) before repeating. This arises from the fact that a −6dB gain is approximately equivalent to a multiplication by ½. Thus, in the volume ramp application, each increment on the counter will correspond to a multiplication by some factor (F1-F6 below) representing a −1dB step. The first step is simply multiplication by unity (F1 in this case), before the sixth increment corresponds to a multiplication by factor F6 to represent a −5dB step. On the seventh step, the multiplication is again by F1 but with a bit shift (representing multiplication by ½).

Alternatively, the volume ramp may use a series of 12 values (each representing a fractional step of −½dB in the gain) before repeating. It will be appreciated that other fractional dB steps may be employed. The number of values in such a series is denoted "m" below.

Thus, in a volume ramp application using 12 values, each increment on the counter will correspond to a multiplication by some factor (F1-F12) each representing a −½dB step. The first step is simply a multiplication by unity (F1 in this case), before the twelfth increment corresponds to a multiplication by factor F12 to represent a −5.5dB step. On the thirteenth step, the multiplication is again by F1 but with a bit shift (representing the multiplication by ½). See the bracketed values in Table 1 below.

In a LUT as outlined above, the coefficient can be viewed as providing the fine adjustment of the output level with the shift value determining the coarse level. The LUT thus consists of repeating sections in each of which the coefficient cycles though its possible values whilst the shift value stays the same, incrementing by one at each new section.

In a typical application, the coefficient and shift values are obtained from the LUT 12, and by means of the multiplier 14 and bit shifter 16 schematically shown in FIG. 2, applied to an input signal $D_{in}$. $D_{in}$ may be parallel multi-bit data or series data. The LUT in this case is shown in Table 1.

TABLE 1

| | | Standard LUT indexing | | |
|---|---|---|---|---|
| Index | Index in LUT | Coefficient | Shift | Gain |
| 0 | 0 | F1 (F1) | 0 (0) | 0 (0) |
| 1 | 1 | F2 | 0 | −1 dB |
| 2 | 2 | F3 | 0 | −2 dB |
| 3 | 3 | F4 | 0 | −3 dB |
| 4 | 4 | F5 | 0 | −4 dB |
| 5 | 5 | F6 | 0 | −5 dB |
| 6 | 6 | F1 | 1 | −6 dB |
| 7 | 7 | F2 | 1 | −7 dB |
| 8 | 8 | F3 | 1 | −8 dB |
| 9 | 9 | F4 | 1 | −9 dB |
| 10 | 10 | F5 | 1 | −10 dB |
| 11 | 11 | F6 (F12) | 1 (0) | −11 dB (−5.5 dB) |
| 12 | 12 | F1 (F1) | 2 (1) | −12 dB (−6 dB) |
| ... | ... | ... | ... | |
| 250 | 250 | F5 | 41 | |
| 251 | 251 | F6 (F12) | 41 | |
| 252 | 252 | F1 (F1) | 42 (21) | |
| 253 | 253 | F2 | 42 | |
| 254 | 254 | F3 | 42 | |
| 255 | 255 | F4 | 42 | |

Thus for a typical 8-bit count there are 256 corresponding combinations of coefficients and shift values which may be applied to the input signal $D_{IN}$. The LUT is therefore very large as unique coefficient and shift values are required for each of the 256 possible input values.

During the digital circuit design the synthesis (from a hardware description language such as Verilog for example) optimisation size is dependent on the repeat cycle length of the two series (the binary nature of the count and the repeat length m of the coefficients). The synthesis tool looks for patterns in the sequence in order to realize the LUT in digital logic. If the sequence is of non-binary length, e.g. m=6 in the above example, this logic becomes very complicated very quickly in order to translate between the count and the repeating sequence. In this example the sequence repeats every 6*8=48 cycles.

SUMMARY OF THE INVENTION

Accordingly, there is a need to reduce the complexity of logical implementation of a LUT containing repeating sections.

According to a first aspect of the present invention, there is provided a logic system comprising: an encoder for converting a first index to a second index; and a LUT arranged to provide an output based on a value stored in the LUT when the second index is applied to it; wherein the LUT is a sparse-coded LUT having dummy values for increasing a repeat length of values stored in the LUT up to a binary length; and the encoder contains logic for converting the first index to the second index such that the dummy values are skipped when the second index is applied to the LUT.

According to a second aspect of the present invention, there is provided a LUT arranged as a plurality of rows each indexed by an index value and storing at least a coefficient associated with each index value, the coefficients stored for successive index values forming a series which repeats after a non-binary-length number m of coefficients, such that the same series of coefficients is repeated a plurality of times within the LUT, wherein the LUT contains n additional rows corresponding to every m rows storing the series of m coefficients, n being 1 or more and (m+n) being a binary-length number.

According to a third aspect of the present invention, there is provided a method of converting first digital data to second digital data using a LUT by applying an index to a LUT having, for each possible index value, a row containing a corresponding coefficient, the coefficients repeating in a cycle after a series of said rows of a number which is not an integer power of two, and applying the corresponding coefficient to the first digital data to obtain the second digital data, the method comprising the step of providing, in the LUT, one or more blank rows in association with each series of rows containing said cycle of coefficients, the number of blank rows when added to the series of rows forming an integer power of two.

By means of the aspects of the present invention as defined above, it is possible to simplify the logical complexity of a LUT by making up the number of rows in each repeating section of the table to an integer power of two. This is done by adding a number of rows as required to each repeating section, for example at the end of each section, these rows containing dummy values (e.g. blanks or zeroes). Encoding of the index (such as a count) applied to the LUT is performed to avoid indexing the dummy values.

An embodiment of the present invention may be incorporated into an audio system. Such an audio system could be mounted on a vehicle such as a car, train, aircraft or boat.

BRIEF DESCRIPTION OF THE DRAWINGS

Reference is made, by way of example only, to the accompanying drawings in which.

DETAILED DESCRIPTION OF THE INVENTION

Before describing an embodiment of the present invention, the underlying principle will first be explained with respect to FIG. 3. FIG. 3(a) shows normal coding as would be used in a LUT 12 of the prior art, and FIG. 3(b) shows the sparse coding employed in a LUT 30 (FIG. 4) embodying the present invention.

In order to reduce the complexity of the LUT 30 when implemented in logic (as designed, for example, using a design package like Verilog), blank locations in the form of a number "n" of additional rows are inserted at the end of each non-binary length series of length "m" to increase the repeating length to a binary number. In other words, "n" is chosen such that (m+n) becomes an integer power of two. By mapping the non-binary-length sequences to a binary length and leaving empty (sparse) the extra locations in the LUT, it is possible to take advantage of the repeating nature of the series of coefficients to minimise the logic required.

Figure 1:
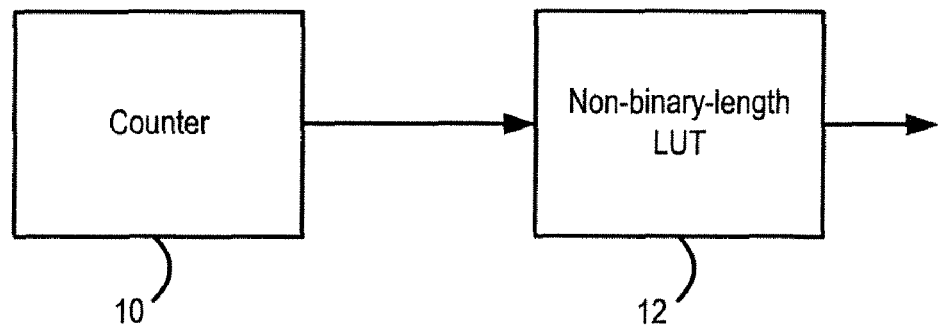
FIG. 1 shows a known arrangement of a counter and look-up table (LUT)
Figure 2:
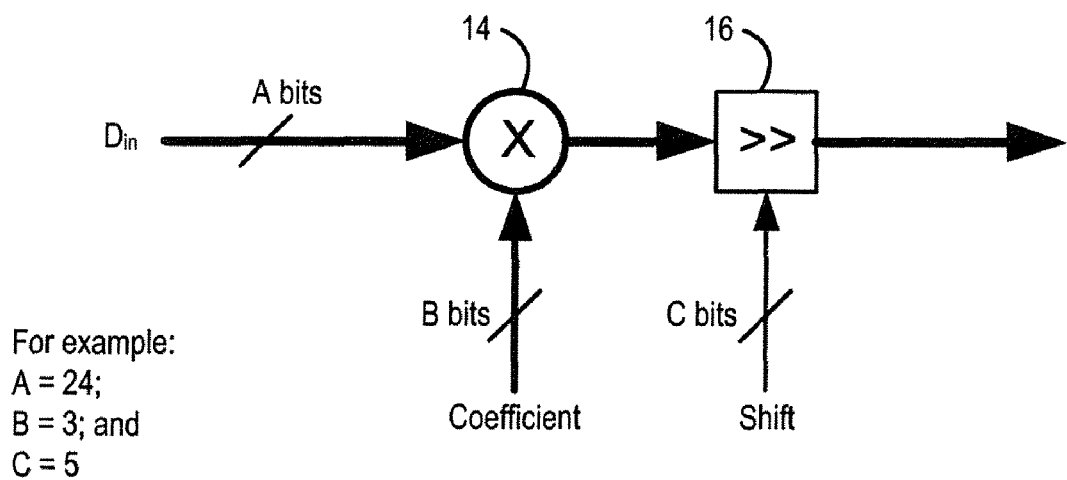
FIG. 2 shows the theoretical implementation of a volume ramp using the LUT of FIG. 1.
Figures 3A, 3B:
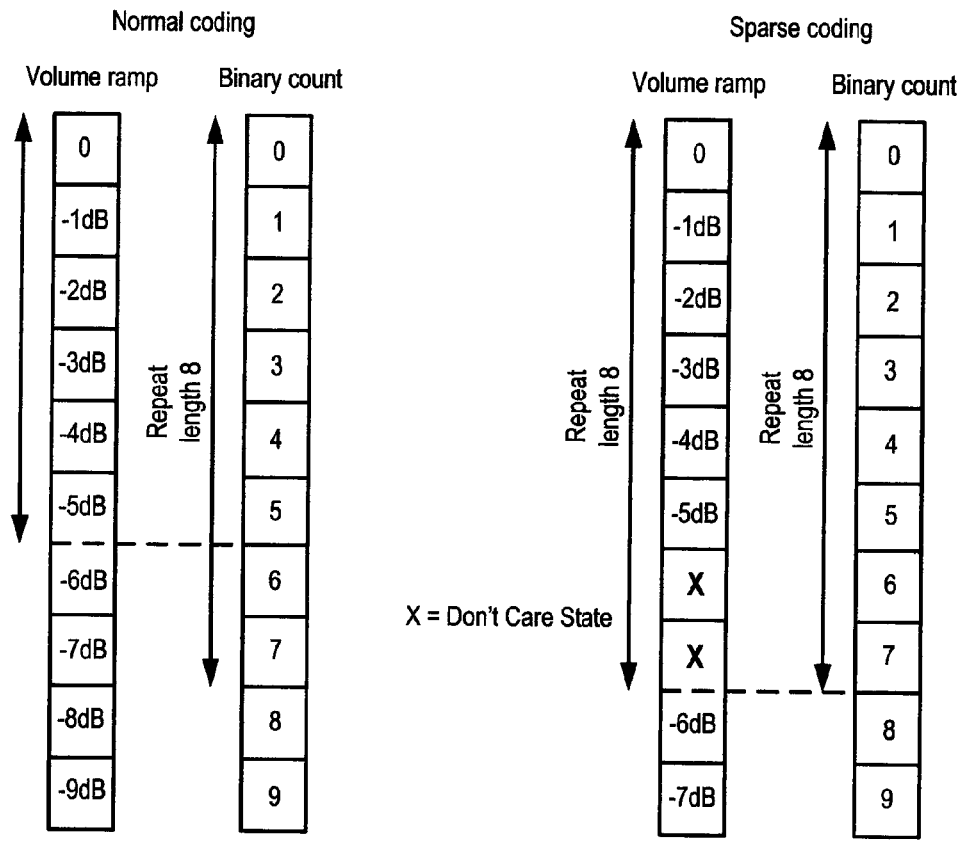
FIG. 3 shows (a) normal coding in a known LUT and (b) sparse coding of a LUT in accordance with an embodiment of the present invention.

As can be seen in the example of FIGS. 3a and 3b, two dummy or blank locations (or four in the case of a −½dB step) are inserted in the LUT 30 at the end of each repeating series of six (or twelve) coefficients.

FIG. 3 shows the sparse coding for the volume ramp case (−1dB steps). Using normal coding, the repeat lengths of the count and the ramp do not match. By adding in two (2) blank locations, the repeat length (6) of the volume ramp can be made equal to an integer (8) power of two, and the repeating lengths can be made to match.

TABLE 2

Indexing the sparse coded LUT
8-bit Index

| 5-bit "shift value" | 3-bit "coefficient" |
|---|---|
| 0 0 0 0 0 | 0 0 0 |
| 0 0 0 0 0 | 0 0 1 |
| 0 0 0 0 0 | 0 1 0 |
| 0 0 0 0 0 | 0 1 1 |
| 0 0 0 0 0 | 1 0 0 |
| 0 0 0 0 0 | 1 0 1 |
| 0 0 0 0 0 | 1 1 0 |
| 0 0 0 0 0 | 1 1 1 |
| 0 0 0 0 1 | 0 0 0 |
| 0 0 0 0 1 | 0 0 1 |
| 0 0 0 0 1 | 0 1 0 |
| . . . | . . . |
| 0 0 0 0 1 | 1 1 1 |
| 0 0 0 1 0 | 0 0 0 |

In this example, the upper portion (i.e. 5 MSBs) of the index then shows the shift value and the lower portion (i.e. 3 LSBs) indexes the number of the coefficient at that time. In Table 2, showing an example of an 8-bit counter, each line represents one index from the counter (starting at 0 and increasing to 255). The last three bits (LSBs) count through the repeating series of coefficients (1 to 8) to be read from the LUT. The first five bits (MSBs) represent the shift value to be applied to the input data signal. In this example, since the index itself provides the shift value, there is no need for the LUT itself to store the shift values.

In the volume ramp example, the coefficients and shift values would normally represent integers, but this is not essential; they could for example be representative of Gray codes or signed-fix point numbers.

Figure 4:
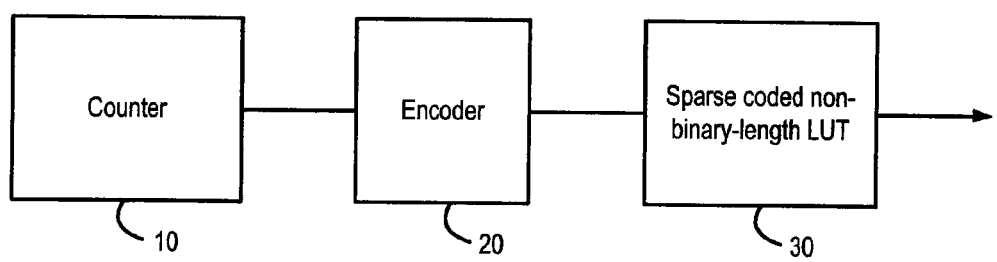
FIG. 4 shows an arrangement, corresponding to FIG. 1, of a counter and a LUT embodying the present invention.

In order to correctly read the LUT (i.e. ensure that the blank locations are skipped over), the sparse sequence is indexed using a simple binary-length sequence to sparse code encoder 20 (see FIG. 4). The encoder 20 maps an index (in this instance, the count from counter 10) to the index used in the LUT by incrementing the count by however much is needed in order to reach the next binary number. For example, in the volume ramp example, the encoder 20 increases the count by 2 each time the standard count reaches modulo 6. Although the encoder initially increases the complexity of the system, for most series of instructions this is more than offset by the reduction in the complexity of the LUT.

Figure 5:
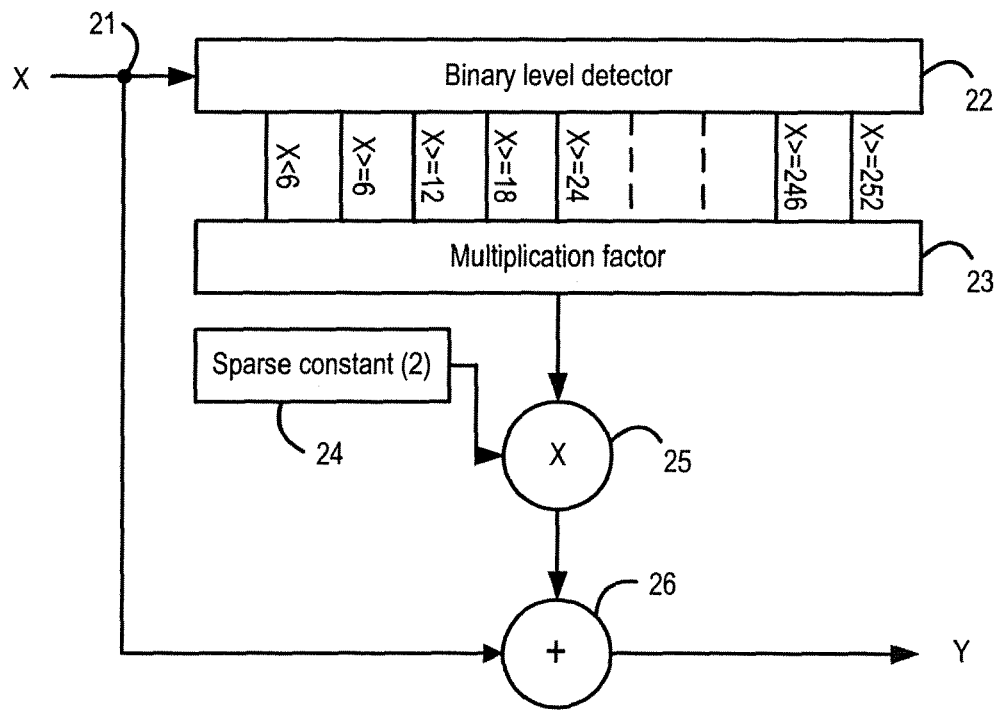
FIG. 5 shows the theoretical implementation of an encoder in the arrangement shown in FIG. 4.

A theoretical example of the implementation of the encoder 20 for the example of a six bit look-up sequence is shown in FIG. 5. The input value X is supplied to an input node 21 of the encoder, and from there is routed in parallel to a binary level detector 22 and an adder 26. The binary level detector 22 issues a signal to a multiplication factor generator 23 indicating the highest power of two present in the input value X. The multiplication factor generator in effect works out from this how many times a sparse constant (see below) should be added to the original index. This is done by multiplying the sparse constant, which is predetermined and held in a register 24, with the multiplication factor from generator 23. Finally, addition of the original index X and the multiplication factor takes place in the adder 26 to yield the modified index Y used to index the sparse-coded LUT.

In this example the initial index X which is from the counter 10 is measured in binary level detector 22 against various levels of the non-binary-length to determine how many times the sparse offset must be added to the input index. If the value of X were 14 then the multiplication value would be 2. This is multiplied by the sparse constant (i.e. the number of locations required to make the repeating sequence up to a binary number) which would then result in the addition of 4 to the input index. Thus the 18th location would then be used in the LUT.

TABLE 3

LUT values

| Count | Index in LUT | Coefficient | Shift | Gain |
|---|---|---|---|---|
| 0 | 0 | F1 | 0 | 0 |
| 1 | 1 | F2 | 0 | −1 dB |
| 2 | 2 | F3 | 0 | −2 dB |
| 3 | 3 | F4 | 0 | −3 dB |
| 4 | 4 | F5 | 0 | −4 dB |
| 5 | 5 | F6 | 0 | −5 dB |
|  | 6 Skip Over |  |  |  |
|  | 7 Skip Over |  |  |  |
| 6 | 8 | F1 | 1 | −6 dB |
| 7 | 9 | F2 | 1 | −7 dB |
| 8 | 10 | F3 | 1 | −8 dB |
| 9 | 11 | F4 | 1 | −9 dB |
| 10 | 12 | F5 | 1 | −10 dB |
| 11 | 13 | F6 | 1 | −11 dB |
|  | 14 Skip Over |  |  |  |
|  | 15 Skip Over |  |  |  |
| 12 | 16 | F1 | 2 | −12 dB |
| 13 | 17 | F2 | 2 | −13 dB |
| 14 | 18 | F3 | 2 | −14 dB |
| 15 | 19 | F4 | 2 | −15 dB |
| 16 | 20 | F5 | 2 | −16 dB |
| 17 | 21 | F6 | 2 | −17 dB |
|  | 22 Skip Over |  |  |  |
|  | 23 Skip Over |  |  |  |
| 18 | 24 | F1 | 3 | −18 dB |
| ... | ... | ... | ... | ... |
| Etc. |  |  |  |  |

Table 3 shows the values for this whole process. The count column shows the count maintained by the counter 10, or more generally the original index X to be looked-up in the LUT, whether from a counter or from some other source. The "index in LUT" column shows the index Y after it has been coded by the encoder (i.e. adapted by adding 2 for each modulo 6 reached by the count). The coefficient and shift columns show the respective values of the coefficient as read from the LUT and the shift value as read from the first five bits of the "Index in LUT" (see Table 2).

Figure 6:
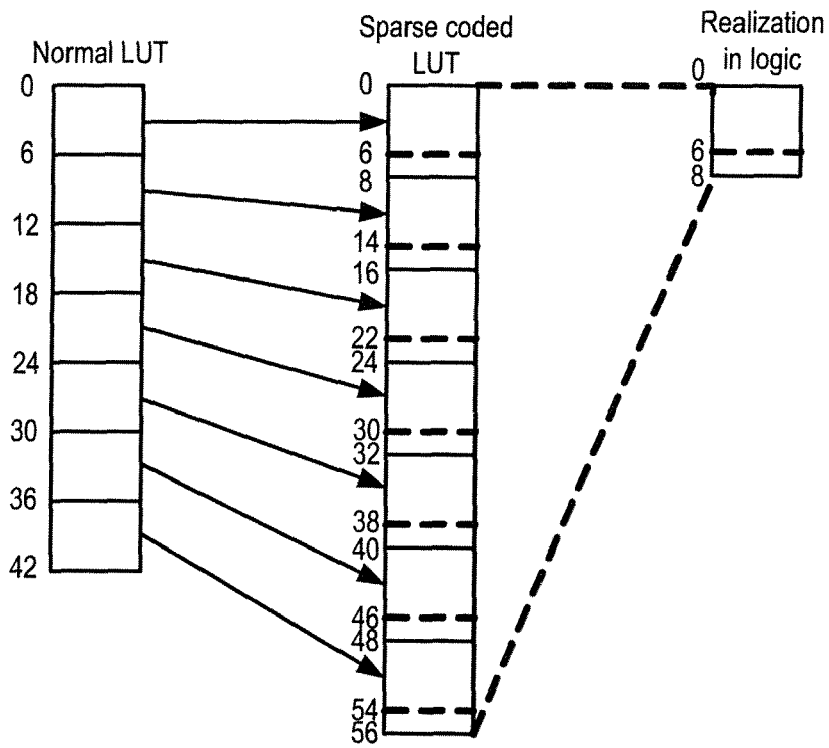
FIG. 6 shows the mapping of a normal LUT to a sparse-coded LUT of the present invention.

FIG. 6 shows how the mapping of a normal LUT to a sparse-coded LUT increases the length of the LUT. Each repeated section is increased in size by adding in the blank values. However, each of the sections repeats every 8 locations, and thus the realization in logic is simple. The only values that need to be stored are the six repeating coefficients and the two blank locations.

As described above, mapping the non-binary sequence to a binary sequence has advantages in greatly reducing the size of the LUT required with reductions in the gate count, power consumption, computational time and die area.

To summarise, the present invention provides a LUT arranged as a plurality of rows each indexed by an index value and storing at least one predetermined value associated with that index value, such as a coefficient to be applied to digital data. The LUT contains repeated sections in which m coefficients stored for successive index values form a cycle. The number m is not an integer power of 2. For example the LUT may be used when converting a digital count to a gain change in dB, in which case m may be 6, 12 or $6 \ast 2^n$, the coefficients representing dB or fractional-dB steps in gain. The LUT contains n additional blank rows added to every repeated section of m rows storing the cycle of m coefficients, n being 1 or more and (m+n) being an integer power of two (such as 8 or 16). The addition of blank rows may conveniently be achieved by inserting them after the cycle of m rows. However, they could alternatively be inserted before the m rows or distributed in between the m rows in some predetermined pattern. By feeding an initial index through encoding logic which takes account of the additional rows, it can be ensured that these are never indexed. Thus, a sparse-coded LUT is provided. Although each repeated section is increased in size, the actual size of the LUT in terms of circuit area or programming logic is reduced because the repeating length is now a power of two.

Embodiments of the present invention can reduce the synthesised area of a digital logic system, increase its speed of operation, and reduce its power consumption.

Primarily, the LUT of the present invention is useful in audio applications (as in the volume ramp example described above), but in principle it could be applied to any system with repeating or partially repeating sequences. The present invention is also applicable to applications that use thermometer or greyscale coding and the like.

Although in the above example, a binary count from a counter is used to generate an index for the LUT, the LUT of the present invention could also be indexed using a value from a Gray coded counter or a counter using some other form of encoding. More generally, the index could be supplied from any arbitrary source.

Although in the volume ramp LUT explained above, the shift values are shown tabulated along with the coefficients, as already mentioned they need not be explicitly present in the LUT, since the shift value can be taken directly from the upper bits of the index.

In the volume ramp example described above, values from the LUT, looked up by an index, are applied to input data to modify that data. Such an arrangement is not essential; in other applications, one or more values from the LUT may themselves represent data without any separate input data being involved. An example would be a LUT used to generate a sinusoidal waveform of fixed frequency. If the sample rate of the sinusoid did not divide into a power-of-two length of samples, the present invention could be applied to make the LUT more space-efficient.

Audio applications of the present invention include portable devices (MP3 players; mobile phones; PDAs and satellite navigation devices); Hi-Fi equipment including disk-based players such as DVD/CD; televisions; and digital cameras (Still & Video). In addition, the present invention may find application in fixed or semi-fixed installations such as in-car entertainment, aircraft on-board entertainment systems and so forth.

What is claimed is:

1. A logic circuit comprising:
an encoder (20) for converting a first index (X) to a second index (Y); and
a look-up table circuit (LUT) (30) arranged to provide an output based on a value stored in the LUT when the second index (Y) is applied to it;

wherein the LUT (30) is a sparse-coded LUT having dummy values that increases a repeat length of values stored in the LUT up to a binary length;

wherein the values stored in the LUT (30) include a coefficient corresponding to each index, the coefficients repeating, or part repeating, after a series of rows having said repeat length;

wherein there is further provided a shift value in association with each index, the shift values being the same for all the rows in said series of rows but increasing at each repetition of the series of rows;

wherein the index value, the coefficients and the shift values are integers, the shift values being altered by one or more after each series of coefficients; and wherein the encoder circuitry (20) contains logic for converting the first index (X) to the second index (Y) such that the dummy values are skipped when the second index is applied to the LUT.

2. The logic circuit according to claim 1 wherein the values stored in the LUT (30) are held in rows, including a row for each possible index (Y).

3. The logic circuit according to claim 1 wherein one or more of said dummy values is added to each series of coefficients so as to form a set of rows of binary length.

4. The logic circuit according to claim 3 wherein said one or more dummy values are inserted after each series of coefficients.

5. The logic circuit according to claim 3 wherein the set of rows including a row for each of the series of coefficients and a row for each of the one or more dummy values is repeated a plurality of times within the LUT (30).

6. The logic circuit according to claim 3 wherein the encoder (20) is arranged to convert the first index (X) to the second index (Y) on the basis of one or more sparse constants which is the number of said one or more added values added to each series of coefficients.

7. The logic circuit according to claim 6 wherein the encoder (20) comprises a binary level detector (22) for detecting the highest binary length value not exceeding the first index (X), a multiplication factor generator (23) for generating a multiplication factor based on the highest binary length, a multiplier (25) for multiplying the sparse constant by the multiplication factor, and an adder (26) for adding the result of said multiplier (25) to the first index (X) to provide the second index (Y).

8. The logic circuit according to claim 1 wherein the dummy values are null values.

9. The logic circuit according to claim 8 wherein the dummy values form blank locations in the LUT (30).

10. The logic circuit according to claim 1 further comprising a counter (10) which outputs the first index (X) to the encoder circuitry (20).

11. An audio system comprising the logic circuit of claim 1.

12. A vehicle comprising an audio system of claim 11.

13. A look-up table circuit (LUT) comprising:
a plurality of rows each indexed by an index value and storing at least a coefficient associated with each index value, the coefficients stored for successive index values forming a series which repeats after a non-binary-length number m of coefficients, such that the same series of coefficients is repeated a plurality of times within the LUT, wherein the LUT contains n additional rows added to every m rows storing the series of m coefficients, n being 1 or more and (m+n) being a binary-length number;

wherein each row has an associated shift value, the shift values being the same for each row within a series of coefficients and increasing at each repetition of the series of coefficients; and wherein the index value, the coefficients and the shift values are integers, the shift values being altered by one or more after each series of coefficients.

14. The LUT according to claim 13 wherein the n additional rows are inserted after every m rows.

15. The LUT according to claim 13 provided with a counter for issuing a count value and encoding logic for modifying the count value to provide the index value so as to exclude indexing the additional rows.

16. The LUT according to claim 13 for use in a volume ramp of an audio system, wherein the coefficient and shift values indexed by the index value are applied to audio data.

17. A method of converting first digital data to second digital data using a look-up table circuit (LUT), comprising:
applying an index to the LUT having, for each possible index value, a row containing a corresponding coefficient, the coefficients repeating in a cycle after a series of said rows of a number which is not an integer power of two, and applying, by a processor, the corresponding coefficient to the first digital data to obtain the second digital data, wherein the LUT includes one or more blank rows in association with each series of rows containing said cycle of coefficients, the number of blank rows when added to the series of rows forming an integer power of two, wherein a shift value is associated with each series of rows, the corresponding coefficient and shift values being applied to the first digital data to obtain the second digital data, wherein the shift values are the same for all the rows in said series of rows but increasing at each repetition of the series of rows, and wherein the index value, the coefficients and the shift values are integers, the shift values being altered by one or more after each series of coefficients.

18. The method according to claim 17 further comprising the step of logically processing a count to provide the index value such that the blank rows are never indexed.

19. The method of claim 17 applied to gain values in an audio system to translate the count into a dB value, the dB value being applied to first digital data in the form of audio data to alter the volume thereof.

* * * * *